United States Patent

Okitsu

[11] Patent Number: 6,006,005
[45] Date of Patent: Dec. 21, 1999

[54] AUTOMATIC TELERECORDING APPARATUS

[75] Inventor: Hiromi Okitsu, Hamamatsu, Japan

[73] Assignee: Yamaha Corporation, Shizuoka-ken, Japan

[21] Appl. No.: 08/893,480

[22] Filed: Jul. 11, 1997

[30] Foreign Application Priority Data

Jul. 22, 1996 [JP] Japan .................................. 8-192215

[51] Int. Cl.⁶ ................................................ H04N 5/91
[52] U.S. Cl. .......................... 386/46; 358/908; 348/907
[58] Field of Search ................................. 386/83, 95, 4, 386/14, 29, 63, 80, 91, 94, 46; 360/5; 358/908; 348/907; H04N 5/91

[56] References Cited

U.S. PATENT DOCUMENTS

| | | | |
|---|---|---|---|
| 5,282,092 | 1/1994 | Wilhelms | 360/5 |
| 5,296,931 | 3/1994 | Na | 348/731 |
| 5,343,251 | 8/1994 | Nafeh | 348/571 |
| 5,345,430 | 9/1994 | Moe | 360/7 |
| 5,396,371 | 3/1995 | Henits et al. | 360/5 |
| 5,526,130 | 6/1996 | Kim | 358/335 |
| 5,537,552 | 7/1996 | Ogasawara et al. | 395/250 |
| 5,668,917 | 9/1997 | Lewine | 358/908 |
| 5,734,444 | 3/1998 | Yoshinobu | 348/731 |

*Primary Examiner*—Wendy Garber
*Assistant Examiner*—Vincent F. Boccio
*Attorney, Agent, or Firm*—Hazel & Thomas, P.C.

[57] ABSTRACT

An automatic telerecording apparatus is comprised of a television antenna which receives a television signal, and a key view-designating block which designates as a key view a view appearing in an identical or similar pattern every time a television program desired to be recorded is broadcast, out of moving picture information based on the television signal received by the antenna. The designated key view is stored in a key view memory, and the moving picture information based on the received television signal is monitored, to detect the key view appearing in the moving picture information. When the key view is detected, the moving picture information is stored over a preset time period.

14 Claims, 5 Drawing Sheets

FIG.3

| | MON | TUE | WED | THU | FRI | SAT | SUN |
|---|---|---|---|---|---|---|---|
| SAPPORO | ☻ | ☻ | ☁ | ☁ | ☁ | ☁ | ☀ |
| SENDAI | ☂ | ☂ | ☁ | ☁ | ☀ | ☁ | ☁ |
| TOKYO | ☁ | ☂ | ☂ | ☁ | ☀ | ☀ | ☁ |
| ......... | ......... | ......... | ......... | ......... | ......... | ......... | ......... |
| FUKUOKA | ☀ | ☀ | ☀ | ☀ | ☀ | ☁ | ☂ |

| COMPRESSED DATA | No. | FLAG |
|---|---|---|
| | 1 | |
| | 2 | |
| | 3 | × |
| | 4 | × |
| | 5 | × |
| | 6 | × |
| KEY VIEW DETECTION | 7 | × |
| | 8 | × |
| | 9 | × |
| | 10 | × |
| | 11 | × |
| | 12 | × |
| | 13 | |
| | 14 | |
| | 15 | |
| | ⋮ | |

…

AUTOMATIC TELERECORDING APPARATUS

BACKGROUND OF THE INVENTION

1. Field of the Invention

This invention relates to an automatic telerecording apparatus which automatically records desired programs from television broadcasting, and more particularly to an automatic telerecording apparatus which is suitable for automatically recording TV programs, such as a weather forecast program and a news program, which have contents thereof frequently updated and are repeatedly broadcast a day.

2. Prior Art

Conventionally, there are known VTRs (Video Tape Recorders) with an automatic telerecording function, i.e. a function of automatically recording desired programs from television broadcasting, which have been set for recording beforehand, to prevent failure to watch the programs and enable watching them at any desired time. To automatically record a desired TV program by a VTR of this kind, the user selects a TV channel through which the TV program is broadcast, and sets a starting time and a terminating time of the program. Then, the VTR receives TV broadcasting over a time period from the set starting time to the set terminating time, extracts moving pictures of the selected TV channel and records the moving pictures on a recording medium such as a magnetic tape, whereby the desired TV program is automatically recorded.

Weather forecast programs and news programs are repeatedly broadcast a day, of which updated information is particularly useful to the audience. Therefore, there is a desire to watch TV programs of this kind at any desired time to obtain updated information thereof.

In the conventional automatic telerecording apparatus (VTR), however, to automatically record a program which has contents thereof frequently updated and is repeatedly broadcast a day, such as a weather forecast program, whenever it is broadcast, the user has to set the apparatus for automatic recording of the program for each time of broadcasting of the program, which is troublesome to the user. Even if such setting has been made, it is a nuisance to reset the VTR for automatic recording of another program, so that the VTR is likely to be exclusively used for automatic recording of a particular program such as weather forecast program. Further, if the user wishes to immediately watch the recorded weather forecast program which usually extends several minutes, it takes much time to rewind the magnetic tape, and thus the VTR is low in operability or slow in starting the reproduction. Moreover, programs of this kind are likely to be erased after they have been reproduced once, and therefore repeated use of the magnetic tape for recording programs can cause various troubles.

SUMMARY OF THE INVENTION

It is an object of the invention to provide an automatic telerecording apparatus which is capable of automatically recording TV programs of a kind having contents thereof frequently updated and being repeatedly broadcast a day, such as a weather forecast program, through a simple setting operation for automatic recording.

It is a further object of the invention to provide an automatic telerecording apparatus which enables viewing updated information on forecast weather, etc. immediately upon reproducing operation thereof.

To attain the objects, according to a first aspect of the invention, there is provided an automatic telerecording apparatus comprising receiver means for receiving a television signal, key view-designating means for designating as a key view a view appearing in an identical or similar pattern every time a television program desired to be recorded is broadcast, out of moving picture information based on the television signal received by the receiver means, key view-storing means for storing the key view designated by the key view-designating means, key view-detecting means for monitoring the moving picture information based on the received television signal, to detect the key view appearing in the moving picture information, and moving picture-storing means for storing the moving picture information over a preset time period when the key view is detected by the key view-detecting means.

Preferably, the automatic telerecording apparatus includes recording time period-setting means for setting the preset time period, based on timing in which the key view is detected, to a time period from a starting time of the television program desired to be recorded to a terminating time of the same.

Also preferably, the automatic telerecording apparatus includes telerecording-instructing means for instructing starting of recording of the television program and terminating of the same, and wherein the key view-designating means designates as the key view the view appearing in the identical or similar pattern out of the moving picture information based on the television signal received from a timing of the starting of the recording designated by the telerecording-instructing means to a timing of the terminating of the same designated by the telerecording-instructing means.

More preferably, the moving picture-storing means always stores the moving picture information based on the received television signal while erasing older moving picture information stored in the moving picture-storing means by overwriting of the moving picture information based on the received television signal, the automatic telerecording apparatus including overwrite-inhibiting means for inhibiting erasure of the older moving picture information by the overwriting over the preset time period.

Further preferably, the overwrite-inhibiting means is responsive to detection of the key view by the key view-detecting means, for inhibiting erasure by the overwriting of the moving picture information stored in the moving picture-storing means at storage locations from a storage location earlier than timing of the detection of the key view, by a time interval from the timing of the starting of the recording designated by the telerecording-instructing means to a timing of designation of the key view by the key view-designating means, to a storage location later than the timing of the detection of the key view, by a time interval from the timing of the designation of the key view to the timing of the terminating of the recording designated by the telerecording-instructing means.

Specifically, the moving picture-recording means is a random-accessible recording medium.

Advantageously, the automatic telerecording apparatus further includes comparison area-designating means for designating part of the key view stored in the key view-storing means as a comparison area for comparison with the moving picture information based on the television signal received by the receiver means, the key view-detecting means comparing the designated comparison area in the key view stored in the key view-storing means with the moving picture information received by the receiver means, to detect the key view appearing in the moving picture information.

Also advantageously, the moving picture-storing means sequentially erases the older moving picture information stored therein, erasure of which has been inhibited by the overwrite-inhibiting means, when an amount of moving picture information stored in the moving picture-storing means exceeds capacity of the same.

More advantageously, the automatic telerecording apparatus includes location-designating means for designating a location of a particular television program from the moving picture information stored in the moving picture-storing means, and second overwrite-inhibiting means for inhibiting erasure by overwriting of the moving picture information stored in the moving picture-storing means, based on the location designated by the location-designating means.

To attain the same objects, according to a second aspect of the invention, there is provided an automatic telerecording method comprising a receiving step of receiving a television signal, a key view-designating step of designating as a key view a view appearing in an identical or similar pattern every time a television program desired to be recorded is broadcast, out of moving picture information based on the television signal received in the receiving step, a key view-storing step of storing the key view designated in the key view-designating step, a key view-detecting step of monitoring the moving picture information based on the received television signal, to detect the key view appearing in the moving picture information, and a moving picture-storing step of storing the moving picture information over a preset time period when the key view is detected in the key view-detecting step.

The above and other objects, features, and advantages of the invention will be more apparent from the following detailed description taken in conjunction with the accompanying drawings.

BRIEF DESCRIPTION OF THE DRAWINGS

FIG. 3 shows, by way of example, a key view displayed on a TV monitor appearing in FIG. 1;

FIG. 4 shows a format of compressed picture data recorded in a moving picture-recording device appearing in FIG. 1; and FIGS. 5A to 5D collectively form a timing chart useful in explaining a manner of carrying out a recording/reproducing-process by the apparatus according to the embodiment, in which:

FIG. 5A shows a manner of setting a key view in a picture of a desired TV program on the TV monitor in automatic recording-setting mode;

FIG. 5B shows how inhibition of overwriting is carried out;

FIG. 5C shows how a program recorded in a random-accessible recording medium is reproduced; and FIG. 5D shows a manner of setting automatic recording of a long-term weather forecast program.

DETAILED DESCRIPTION

The invention will now be described in detail with reference to the drawings showing an embodiment thereof.

Figure 1:
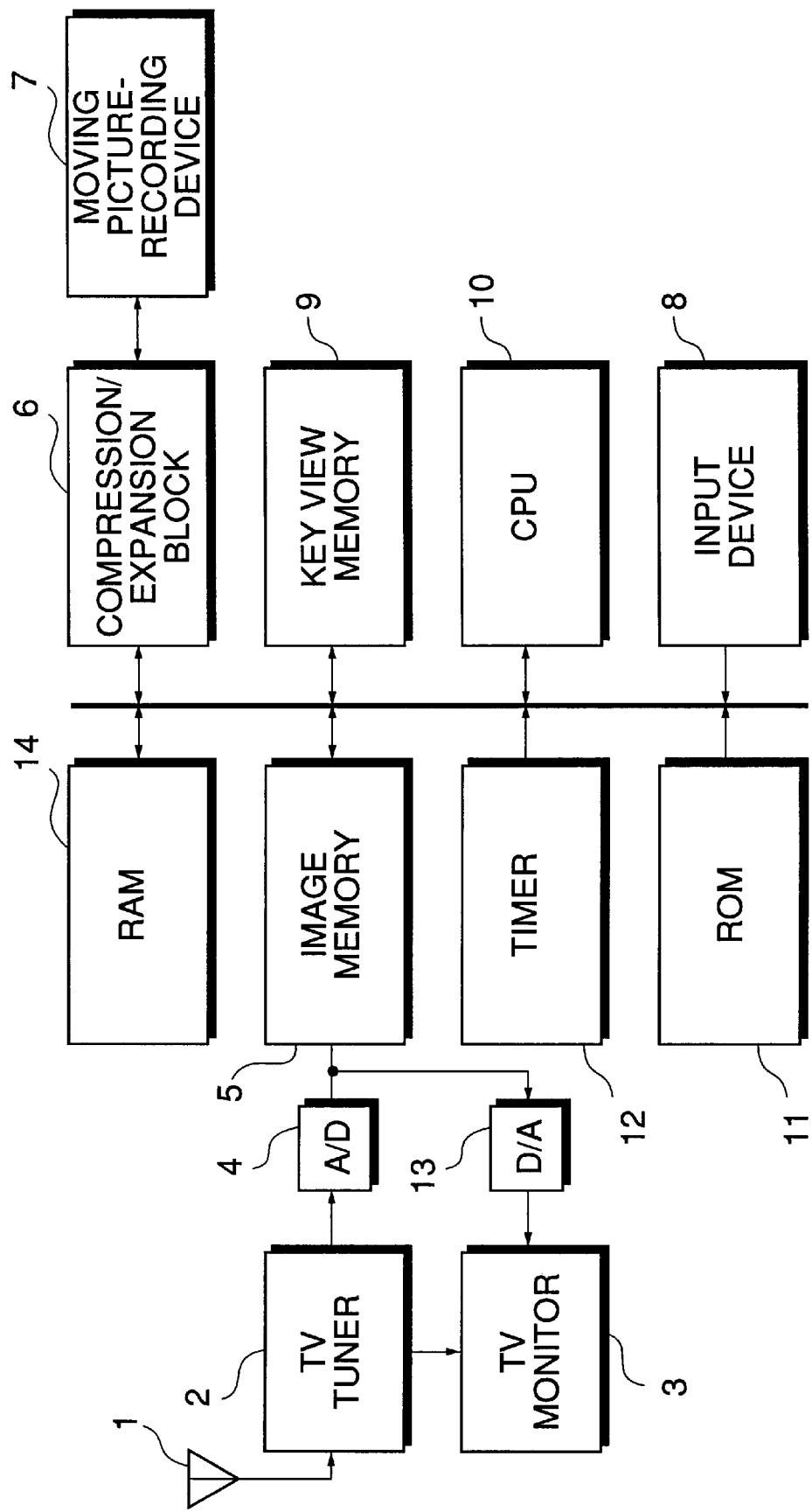
FIG. 1 is a block diagram schematically showing the arrangement of an automatic telerecording apparatus according to an embodiment of the invention.

Referring first to FIG. 1, there is illustrated the arrangement of a television receiver provided with an automatic telerecording apparatus according to an embodiment of the invention.

The television receiver has a display function of displaying TV broadcasting received thereby, a telerecording function of recording desired programs from TV broadcasting, such as a weather forecast program, and a reproducing function of reproducing the recorded programs.

The television receiver has a receiver/display system constructed such that a signal of a channel selected by an operator is taken out by a TV tuner 2 from a TV broadcasting wave received by a TV antenna 1, which is converted into an intermediate frequency signal, and a video signal and an audio signal are taken out from the intermediate frequency signal, which are displayed and sounded, respectively, by a TV monitor 3.

The television receiver has a picture-recording system constructed such that a video signal output from the TV tuner 2 is converted into a digital signal by an A/D converter 4, which is once stored in an image memory 5 as moving picture data. The moving picture data stored in the image memory 5 is always supplied to a compression/expansion block 6, where they are compressed by an image data compression method such as DCT (Discrete Cosine Transform). Then, the compressed data are stored in a moving picture-recording device 7 which may be a RAM (Random Access Memory), a hard disk, or an optical disk. Old moving picture data already stored in the moving picture-recording device 7 are erased by overwriting of new moving picture data whenever the latter is stored in the device 7. Out of the moving picture data stored in the image memory 5, data indicative of a view which appears in an identical or similar pattern in a weather forecast program for example every time the program is broadcast, such as a view of a weather chart or a weekly forecast weather chart, are stored as key view data in a key view memory 9, through operation of an input device 8, which may be a control panel or an infrared remote controller. A CPU 10 executes processes including a process of pattern-matching a view being broadcast with the key view, according to a program stored in a ROM (Read Only Memory) 11. Further, the starting time of a TV program to be recorded, the terminating time of the same, and a key view in the TV program are designated by operating the input device 8, and the designated starting time, terminating time, and the time of appearance of the designated key view are set to a timer 12. When the times are set to the timer 12, the CPU 10 calculates time intervals between these times and stores the calculated time intervals in the RAM 14.

The television receiver has a video reproduction system constructed such that the compressed data read from the moving picture-recording device 7 are expanded by the compression/expansion block 6 and converted into an analog signal by a D/A converter 13 to be reproduced or displayed by the TV monitor 3.

Figure 2:
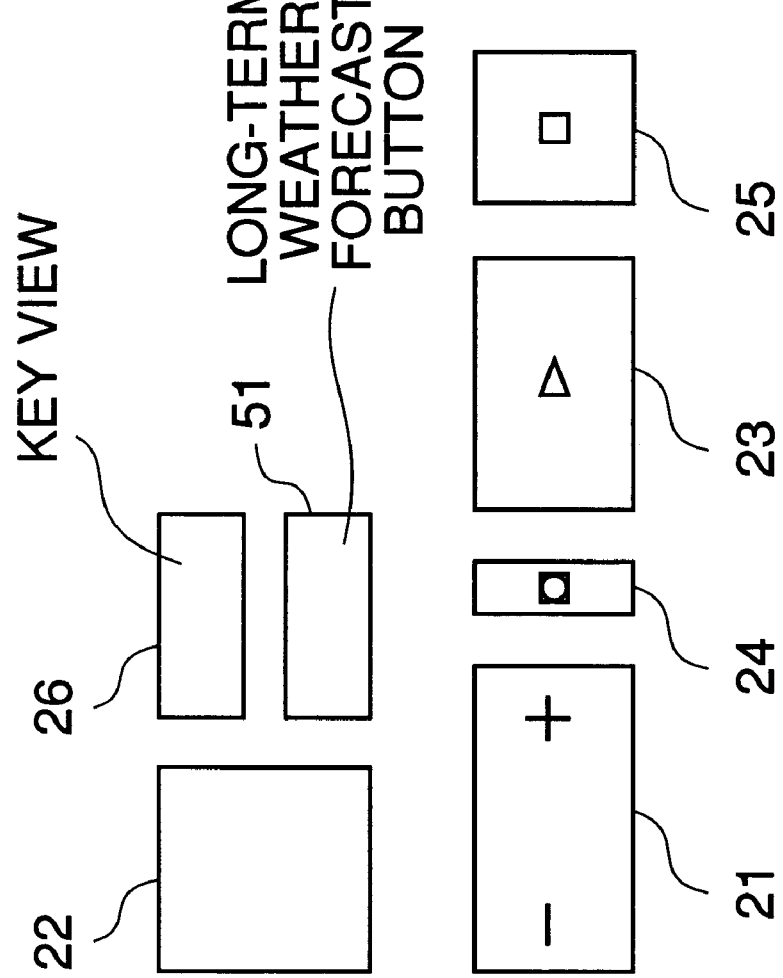
FIG. 2 is a diagram schematically showing the arrangement of an input device appearing in FIG. 1.

FIG. 2 shows details of the arrangement of the input device 8.

The input device 8 is comprised of a channel changeover button 21 for selecting a channel of a TV program desired to be recorded, such as a weather forecast program, by setting the TV tuner 2 to receive the same channel, a display block 22 for displaying the channel number of the selected channel, a start button 23 for instructing starting of reproduction of a program, a telerecording mode button 24 for setting the start button 23 to a recording-setting mode, a stop button 25 for instructing stopping of the reproduction of a program, a key view button 26 for causing the selected key view to be stored in the key view memory 9, a comparison area-designating block 27 for designating a comparison area for detecting the desired TV program set for recording, in the key view, and an assist button 28 for assisting the comparison area-designating block 27. In setting recording of a TV program, the start button 23 is depressed to designate the starting time of the TV program, and the depression timing, i.e. the starting time is set to the timer 12, while the stop button 25 is depressed to designate the terminating time of the TV program, and the depression timing, i.e. the terminating time is set to the timer 12. The key view button 26 is depressed to designate a key view, and the depression timing, i.e. the time of first appearance of the key view is set to the timer 12. The comparison area-designating block 27 may be formed by a track pad or the like.

FIG. 3 shows an example of the key view displayed on the TV monitor 3.

A view which appears in an identical or similar pattern in the TV program desired to be recorded every time the program is broadcast, such as a view of a weather chart or a weekly forecast weather chart, is designated as a key view by operating the key view button 26 of the input device 8 and data of the designated key view are stored in the key view memory 9. In the illustrated example, a weekly forecast weather chart of a weather forecast program is displayed as the designated key view. After designation of the key view, a comparison area is designated on the designated key view by operating the comparison area-designating block 27 and the assist button 28. In the case of a weekly forecast weather chart as illustrated in FIG. 3, an area of the key view which appears in an identical or similar pattern every time the program is broadcast, e.g. the column of city names, is designated as the comparison area, while columns or rows of symbols of fine weather, cloudy weather, etc. which changes whenever the program is broadcast are not designated as the comparison area.

FIG. 4 shows a format of picture data recorded in the moving picture-recording device 7.

The moving picture-recording device 7 has a plurality of storage areas arranged in succession, in which items of compressed data 31 are sequentially stored. Recording numbers 32 are allotted to the storage areas to indicate the sequence of recording of the respective items of the compressed data 31. When a key view is detected and designated in setting recording of a TV program, overwrite-inhibiting flags 33 are set for items of the compressed data 31 within storage areas from a storage area earlier than the time of designation of the key view by the time interval stored in the RAM 14 to a storage area later than the same by the time interval stored in the RAM 14 to inhibit erasure of the items of compressed data within these storage areas by overwriting after the setting of recording of the TV program. In reproduction of the recorded compressed data 31, the items of compressed data for which the overwrite-inhibiting flags have been set, are read in the sequence according to the recording numbers 32.

Next, description will be made of the operation of recording and reproducing of the automatic telerecording apparatus constructed as above, with reference to FIGS. 5A to 5D.

First, to set recording of a TV program, the channel changeover button 21 is operated to select a channel of a TV program desired to be recorded, such as a weather forecast program, by setting the TV tuner 2 to receive the same channel. Then, a video signal output from the TV tuner 2 is delivered through the A/D converter 4 to the image memory 5 to be once stored therein.

Figure 5A:
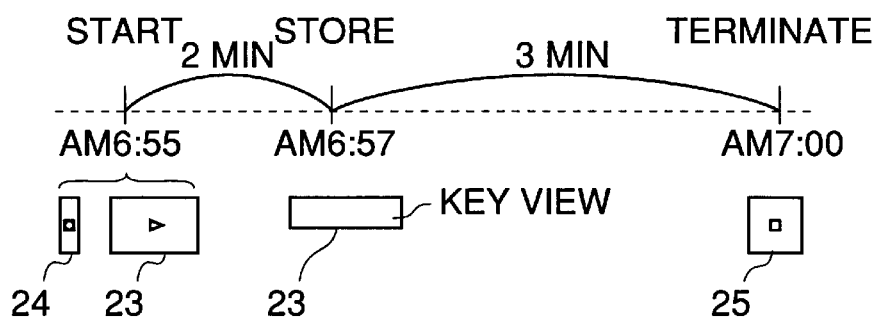

When the desired TV program starts to be broadcast, as shown in FIG. 5A, the recording mode button 24 and the start button 23 are both depressed by the operator upon starting of the TV program, and at the same time the CPU 10 delivers a signal indicative of the timing of depression of these buttons to the timer 12 to cause the same to store the starting time of the TV program, i.e. "AM6:55". Thereafter, when a view appearing in an identical or similar pattern every time of broadcasting of the TV program, such as a weekly forecast weather chart in a weather forecast program, appears in the view displayed on the TV monitor 3, the key view button 26 is depressed by the operator to store the same view in the key view memory 9 as the key view, and then the CPU 10 delivers a signal indicative of the completion of storage of the key view to the timer 12 to cause the same to store the time of the completion of storage of the key view, i.e. "AM6:57". At the same time, the CPU 10 stores the time of the completion of storage in the RAM 14 and also calculates the time interval between the starting time of the TV program and the time of the completion of storage, i.e. "2 minutes" and stores the same in the RAM 14. Thereafter, when the TV program terminates, the stop button 25 is depressed by the operator to deliver a signal indicative of the terminating time of the TV program, i.e. "AM7:00", to the timer 12 to cause the same to store the same time. At the same time, the CPU 10 calculates, based on the terminating time, the time interval (3 minutes) between the time of the completion of storage of the key view and the terminating time of the program and stores the same in the RAM 14.

After setting of the recording of the TV program as above, the comparison area is designated. First, the key view button 26 is depressed by the operator to read data of the designated key view from the key view memory 9 and display the same on the TV monitor 3. When the key view has thus been read and displayed on the TV monitor 3, the comparison area-designating block 27 and the assist button 28 are operated by the operator to designate the comparison area. More specifically, in the case of the weather forecast chart of FIG. 3, for example, the comparison area-designating block 27 is operated such that a cursor C is placed at a point $P_1$ corresponding to one of four corners of an area of city names which remains unchanged, other than areas where symbols indicative of fine weather, cloudy weather, etc. are indicated. Then, the block 27 is operated so that the cursor C moves to a point $P_2$ corresponding to another corner opposite to the above one corner while the assist button 28 is continuously depressed. When a frame 41 defined by a section connecting between the points $P_1$ and $P_2$ as a diagonal line thereof is superposed on the area of city names, the assist button 28 is released, whereby the area defined by the frame 41 is designated as the comparison area. Coordinate data (x1, y1) and (x2, y2) indicative of the respective apexes P1 and P2 of the designated comparison area are stored, e.g. in the key view memory 9.

Figure 5B:
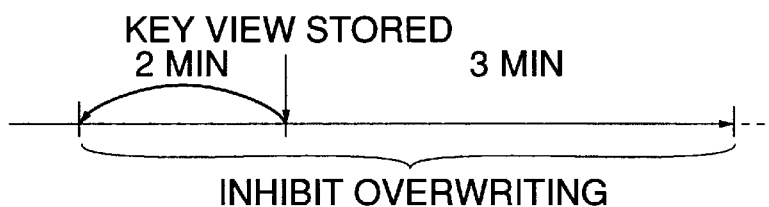

After the designation of the comparison area, picture data of TV programs which are subsequently broadcast are sequentially stored in the image memory 5, compressed by the compression/expansion block 6 and stored in the moving picture-recording device 7. When the amount of data stored in the moving picture-recording device 7 exceeds the memory capacity of the device 7, the earliest data stored in the device 7 are sequentially erased by overwriting by newly stored data. The CPU 10 always compares data of broadcast views sequentially stored in the image memory 5 with the designated comparison area to determine whether or not the broadcast views contain an area identical with the designated comparison area. If it is determined that any broadcast view contains an area identical with the designated comparison area, the CPU 10 judges that the desired TV program that has been set for recording has been detected, and then, as shown in FIG. 5B, the CPU 10 sets overwrite-inhibiting flags for items of compressed picture data stored in the moving picture-recording device 7 within storage areas from a storage area earlier than the time point at which the desired TV program has been detected, by a time interval equal to the time interval (stored in the RAM 14; 2 minutes in the above example) between the starting time of the same TV program broadcast on the last occasion and the time point of the completion of storage of the designated key view of the last broadcast same TV program, to a storage area corresponding to the time point of detection of the present broadcast desired TV program, to inhibit erasure of these items of compressed picture data by overwriting of subsequent new data. Further, upon the lapse of a time interval from the above time point of detection of the desired TV program, which is equal to the time interval (stored in the RAM 14; 3 minutes in the above example) between the time point of the completion of storage of the designated key view of the last broadcast same TV program and the terminating time of the same, the CPU 10 sets overwrite-inhibiting flags for items of compressed picture data stored in the moving picture-recording device 7 within storage areas from a storage area earlier than the present time point by the time interval (3 minutes) stored in the RAM 14 to a storage area corresponding to the present time point, to inhibit overwriting of these items of compressed picture data by subsequent new data. Thus, picture data of the desired TV program are sequentially stored in the moving picture-recording device 7 without being erased by overwriting of subsequent new data. After data including data of the desired TV program have been stored in the moving picture-recording device 7 to its capacity, even data of the earliest broadcast desired TV program are erased by overwriting of subsequent new data.

As described above, according to the present embodiment, in setting automatic recording of a desired TV program, a view of an image pattern which remains unchanged every time of broadcasting of the desired TV program is stored as a key view, and when the same key view is detected from a view of a TV program subsequently broadcast and received, moving picture data received over a preset time period with respect to the time point of the detection of the key view are stored in a manner being inhibited from being erased by overwriting. As a result, the desired TV program can be recorded each time it is broadcast, through a simple setting operation, i.e. registration of the key view, dispensing with the need of setting recording of the desired TV program for each time of broadcasting of the same program. Further, even if the key view appears in the middle of the desired TV program, the entire views of the desired TV program can be recorded only by a one-time operation of setting the starting time of the program and the terminating time of the same and designating the key view upon appearance thereof on the TV monitor 3 by operating the input device 8, whereby the automatic telerecording apparatus automatically operates to always record subsequently received moving picture data while overwriting new data over the old recorded data, and when the designated key view is detected, moving picture data received and recorded from a time point earlier by a time period set based on the stored starting time and time of designation of the key view, to a time point later by a time period set based on the stored terminating time are inhibited from being erased by overwriting of subsequently received new data. Thus, the entire desired TV program can be recorded from the start of the program to the end thereof irrespective of the timing of appearance of the key view.

Further, according to the present embodiment, part of the key view is designated as a comparison area for comparison with subsequently received moving picture data by the comparison area-designating block 27 and the assist button 28. As a result, even if the designated key view contains images which change each time the TV program is broadcast, such as symbols indicative of fine weather, cloudy weather, etc., such images can be eliminated from the comparison area, to thereby accurately detect the program desired to be recorded.

Figure 5C:
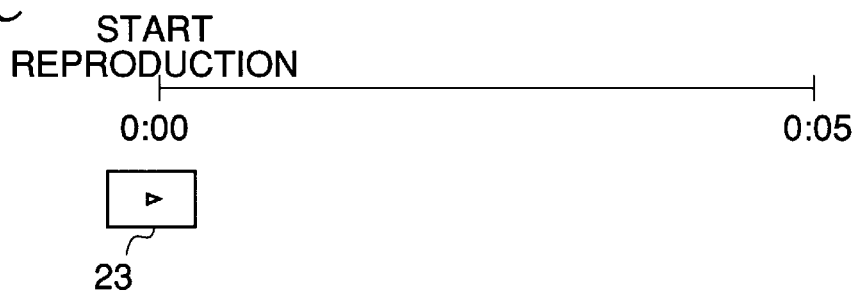

Still further, according to the embodiment, the moving picture-recording device 7 may be a random-accessible recording medium such as a RAM, a hard disk, and an optical disk. As a result, as shown in FIG. 5C, a rewinding operation as required in the case of a video tape, can be omitted. Therefore, immediately upon depression of the start button 23, the recorded TV program can be reproduced and displayed on the TV monitor 3 to enable the operator to know updated information on the forecast weather, etc. at once. Since the automatic telerecording apparatus according to the embodiment is incorporated within a TV receiver as an additional function, the TV receiver can exhibit a function of an ordinary television but also a function of a simplified on-demand television which can reproduce updated weather forecast information, news whenever one desires.

Figure 5D:
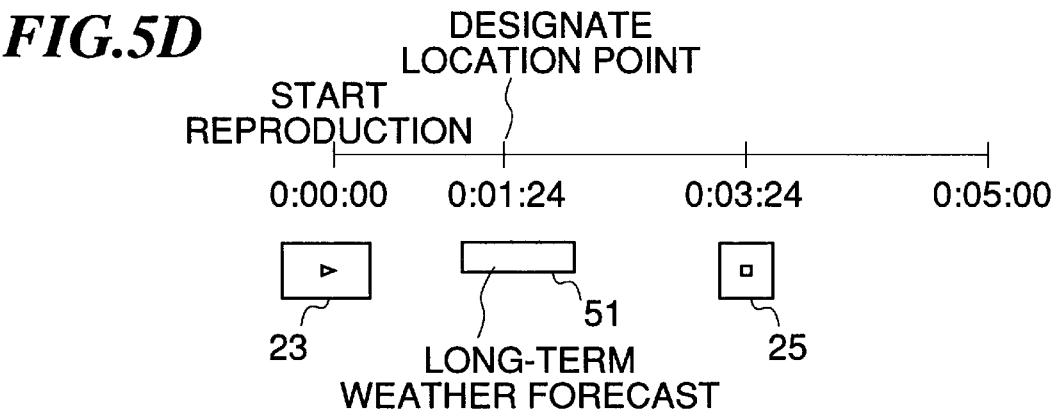

In this regard, a long-term weather forecast is issued before a vacation such as the Golden Week in Japan and broadcast immediately after issuance by the Meteorological Agency. If such a long-term forecast program is entirely erased by overwriting of subsequent data, even after it is once reproduced and watched by the audience, it can no longer be reproduced for watching when it is desired to do so later. To eliminate this inconvenience, a long-term weather forecast button 51 may be provided for the input device 8, as shown in FIG. 2, for storing a location of a long-term forecast program in the storage area of the moving picture-recording device 7 after the long-term forecast program has been recorded therein. As shown in FIG. 5D, the start button 23 is depressed to reproduce data stored in the moving picture-recording device 7. When the recorded long-term forecast program is started to be reproduced, the long-term weather forecast button 51 is depressed to store a count value "0:01:24" of the timer 12 then assumed, and when the reproduction of the long-term forecast program is ended, the stop button 25 is depressed to store a count value "0:03:24" of the timer 12 then assumed. As a result, erasure of data of the long-term forecast program recorded at an area corresponding to a time period between the two stored count values of the timer 12 by overwriting of subsequently received new data can be inhibited. Further, a plurality of key views may be stored in the key view memory 9, or days of the week, shown in FIG. 3, etc. may be additionally set as the comparison area to thereby sort the broadcast view and store the same in the moving picture-recording device 7.

Although in the above described embodiment, how to process the audio signal taken out from the TV broadcasting signal is not shown, it may be processed in a similar manner to the video signal processed as described above.

What is claimed is:

1. An automatic telerecording apparatus comprising:

receiver means for receiving a television signal;

key view-designating means for designating as a key view a view appearing in an identical or similar pattern in a particular television program desired to be recorded every time said television program desired to be recorded is broadcast, out of moving picture information based on said television signal received by said receiver means, said key view being selected by a user;

key view-storing means for storing said key view designated by said key view-designating means;

key view-detecting means for monitoring said moving picture information based on said received television signal, to detect said key view appearing in said moving picture information; and moving picture-storing means for storing said moving picture information including said key view over such a present time period as to record a predetermined part or a whole of said particular television program when said key view is detected by said key view-detecting means.

2. An automatic telerecording apparatus as claimed in claim 1, including recording time period-setting means for setting said preset time period, based on timing in which said key view is detected, to a time period from a starting time of said television program desired to be recorded to a terminating time of the same.

3. An automatic telerecording apparatus as claimed in claim 1, including telerecording-instructing means for instructing starting of recording of said television program and terminating of the same, and wherein said key view-designating means designates as said key view said view appearing in said identical or similar pattern out of said moving picture information based on said television signal received from a timing of said starting of said recording designated by said telerecording-instructing means to a timing of said terminating of the same designated by said telerecording-instructing means.

4. An automatic telerecording apparatus according to claim 1, wherein said moving picture-recording means is a random-accessible recording medium.

5. An automatic telerecording apparatus according to claim 1, further including comparison area-designating means for designating part of said key view stored in said key view-storing means as a comparison area for comparison with said moving picture information based on said television signal received by said receiver means, said key view-detecting means comparing said designated comparison area in said key view stored in said key view-storing means with said moving picture information received by said receiver means, to detect said key view appearing in said moving picture information.

6. An automatic telerecording apparatus comprising:

receiver means for receiving a television signal;

key view-designating means for designating as a key view a view appearing in an identical or similar pattern in a particular television program desired to be recorded every time said television program desired to be recorded is broadcast, out of moving picture information based on said television signal received by said receiver means, said key view being selected by a user;

key view-storing means for storing said key view designated by said key view-designating means;

key view-detecting means for monitoring said moving picture information based on said received television signal, to detect said key view appearing in said moving picture information;

moving picture-storing means for storing said moving picture information including said key view over such a present time period as to record a predetermined part or a whole of said particular television program when said key view is detected by said key view-detecting means; and telerecording-instructing means for instructing starting of recording of said television program and terminating of the same, wherein said key view-designating means designates as said key view said view appearing in said identical or similar pattern out of said moving picture information based on said television signal received from a timing of said starting of said recording designated by said telerecording-instructing means to a timing of said terminating of the same designated by said telerecording-instructing means, and wherein said moving picture-storing means always stores said moving picture information based on said received television signal while erasing older moving picture information stored in said moving picture-storing means by overwriting of said moving picture information based on said received television signal, said automatic telerecording apparatus including overwrite-inhibiting means for inhibiting erasure of said older moving picture information over said preset time period.

7. An automatic telerecording apparatus as claimed in claim 6, wherein said overwrite-inhibiting means is responsive to detection of said key view by said key view-detecting means, for inhibiting erasure by said overwriting of said moving picture information stored in said moving picture-storing means at storage locations from a storage location earlier than timing of said detection of said key view, by a time interval from said timing of said starting of said recording designated by said telerecording-instructing means to a timing of designation of said key view by said key view-designating means, to a storage location later than said timing of said detection of said key view, by a time interval from said timing of said designation of said key view to said timing of said terminating of said recording designated by said telerecording-instructing means.

8. An automatic telerecording apparatus according to claim 7, wherein said moving picture-storing means sequentially erases said older moving picture information stored therein, erasure of which has been inhibited by said overwrite-inhibiting means, when an amount of moving picture information stored in said moving picture-storing means exceeds capacity of the same.

9. An automatic telerecording apparatus according to claim 7, including location-designating means for designating a location of a particular television program from said moving picture information stored in said moving picture-storing means, and second overwrite-inhibiting means for inhibiting erasure by overwriting of said moving picture information stored in said moving picture-storing means, based on said location designated by said location-designating means.

10. An automatic telerecording apparatus according to claim 6, wherein said moving picture-storing means sequentially erases said older moving picture information stored therein, erasure of which has been inhibited by said overwrite-inhibiting means, when an amount of moving picture information stored in said moving picture-storing means exceeds capacity of the same.

11. An automatic telerecording apparatus according to claim 6, including location-designating means for designating a location of a particular television program from said moving picture information stored in said moving picture-storing means, and second overwrite-inhibiting means for inhibiting erasure by overwriting of said moving picture information stored in said moving picture-storing means, based on said location designated by said location-designating means.

12. An automatic telerecording method comprising:

a receiving step of receiving a television signal;

a key view-designating step of designating as a key view a view appearing in an identical or similar pattern in a particular television program desired to be recorded every time said television program desired to be recorded is broadcast, out of moving picture information based on said television signal received in said receiving step, said key view being selected by a user;

a key view-storing step of storing said key view designated in said key view designating step;

a key view-detecting step of monitoring said moving picture information based on said received television signal, to detect said key view appearing in said moving picture information; and a moving picture-storing step of storing said moving picture information including said key view over such a preset time period as to record a predetermined part or a whole of said particular television program when said key view is detected in said key view-detecting step.

13. An automatic telerecording method as claimed in claim 12, further comprising a telerecording-instructing step of instructing starting of recording of said television program and terminating of same.

14. An automatic telerecording method as claimed in claim 12, further comprising an overwriting step of overwriting older stored moving picture information with new moving picture information.

* * * * *